United States Patent [19]
Wu

[11] Patent Number: 5,957,543
[45] Date of Patent: Sep. 28, 1999

[54] STRUCTURE OF GOLF CART WHEEL HOLDER ASSEMBLY

[76] Inventor: Ching-Chang Wu, No. 35-1, Jih Hsin St., Tu Cheng Hsiang, Taipei Hsien, Taiwan

[21] Appl. No.: 08/956,455

[22] Filed: Oct. 23, 1997

[51] Int. Cl.$^6$ .................................................. B60B 29/00
[52] U.S. Cl. .......................... 301/111; 301/114; 301/131; 301/112; 301/1; 280/DIG. 6; 411/199; 411/200
[58] Field of Search ..................................... 301/111, 114, 301/131, 112, 1; 280/DIG. 6; 411/300, 522, 199, 200

[56] References Cited

U.S. PATENT DOCUMENTS

| | | | |
|---|---|---|---|
| 534,897 | 2/1895 | Liddell | 301/112 |
| 705,812 | 7/1902 | Anderson | 411/300 |
| 1,516,664 | 11/1924 | Blank | 301/35.63 |
| 1,844,100 | 2/1932 | Mozni | 301/35.63 |
| 1,931,386 | 10/1933 | Hughes | 411/300 |
| 2,232,859 | 2/1941 | Limprecht | 301/35.63 |
| 2,372,884 | 4/1945 | Davis | 411/300 |
| 4,462,638 | 7/1984 | DenBesten | 411/300 |
| 5,120,170 | 6/1992 | Kalies | 411/300 |
| 5,171,068 | 12/1992 | Wu | 301/111 |
| 5,507,566 | 4/1996 | Chen | 301/111 |
| 5,658,054 | 8/1997 | Wu | 301/111 |
| 5,704,100 | 1/1998 | Swan | 411/522 |
| 5,810,535 | 9/1998 | Fleckenstein et al. | 411/522 |
| 5,823,555 | 10/1998 | Ashman | 301/111 |

Primary Examiner—D. Glenn Dayoan
Assistant Examiner—Long Bao Nguyen
Attorney, Agent, or Firm—Varndell & Varndell, PLLC

[57] ABSTRACT

A golf cart wheel axle assembly having a holder plate connected to the frame of a golf cart to hold a wheel axle by a lock screw, wherein a rivet is fastened in a transversely extended rivet hole on the holder plate and peripherally engaged into an annular groove around a shoulder on the lock screw to stop the lock screw from an axial movement relative to the wheel axle.

1 Claim, 2 Drawing Sheets

STRUCTURE OF GOLF CART WHEEL HOLDER ASSEMBLY

BACKGROUND AND SUMMARY OF THE INVENTION

The present invention relates to a golf cart wheel holder assembly, and more specifically to improvement on U.S. Pat. No. 5,171,068.

A golf cart wheel holder assembly according to U.S. Pat. No. 5,171,068 comprises a holder plate connected to the frame of a golf cart to hold a wheel axle by a lock screw, wherein the wheel axle has a tapered rod and a rectangular block longitudinally aligned and respectively inserted into a tapered hole and a rectangular hole on the tapered rod, having a split circular projection engaged into an annular groove inside the tapered hole. The design of the split circular projection complicates the fabrication process of the lock screw. Further, the split circular projection of the lock screw may be forced out of the engaged position in the annular groove in case the golf cart bears a heavy load and runs over an uneven ground area.

The present invention has been accomplished to provide an improvement which eliminates the aforesaid drawbacks. According to the invention, a slot is made inside the tapered hole of the holder plate, an annular groove is provided around a shoulder on the lock screw, and a rivet is fastened to the holder plate with its periphery partially projecting through the slot inside the tapered hole and engaged into the annular groove on the shoulder of the lock screw to stop the lock screw from an axial movement relative to the wheel axle.

DETAILED DESCRIPTION OF THE PREFERRED EMBODIMENT

Figure 1:
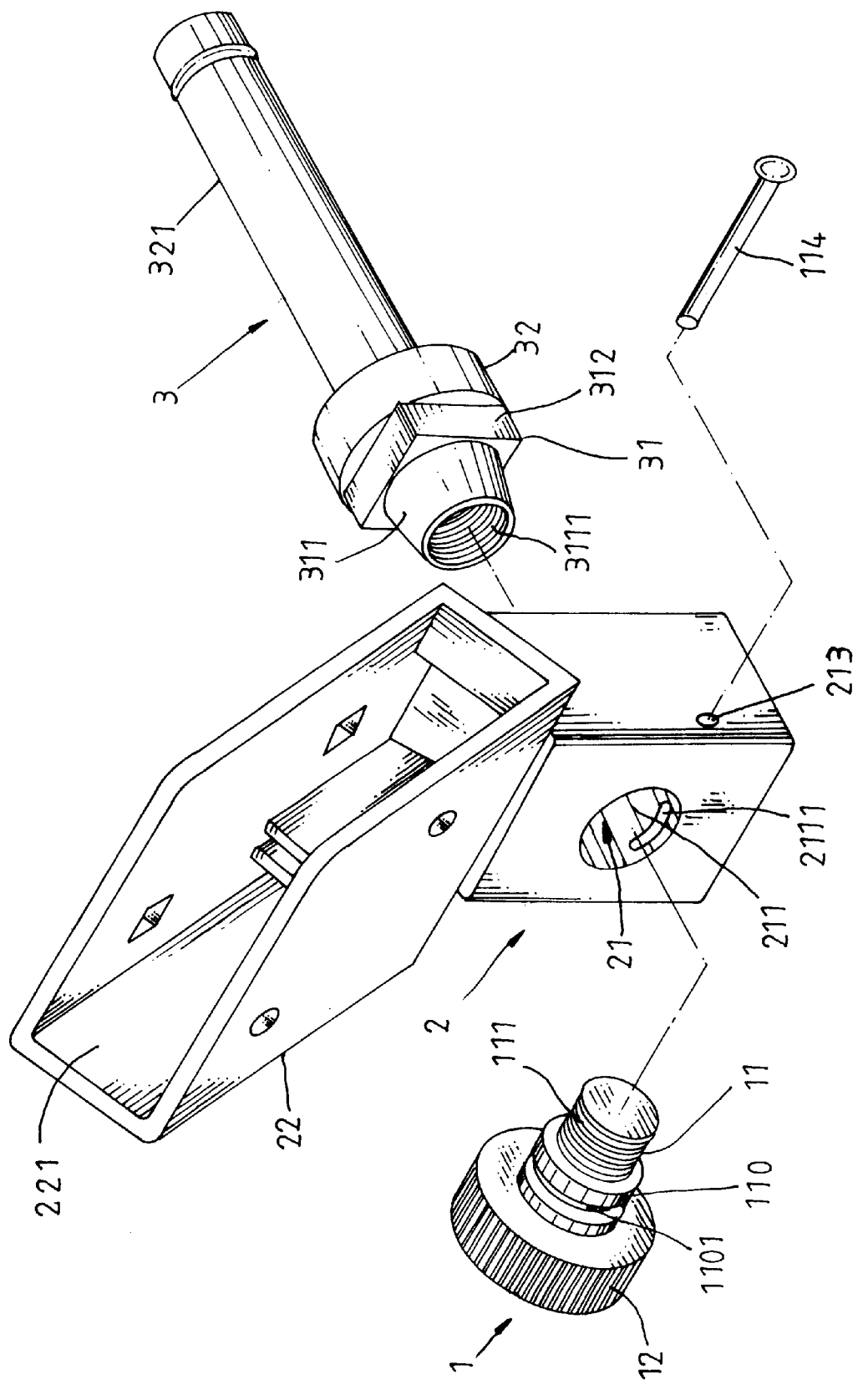
FIG. 1 is an exploded view of a golf cart wheel holder assembly according to the present invention.
Figure 2:
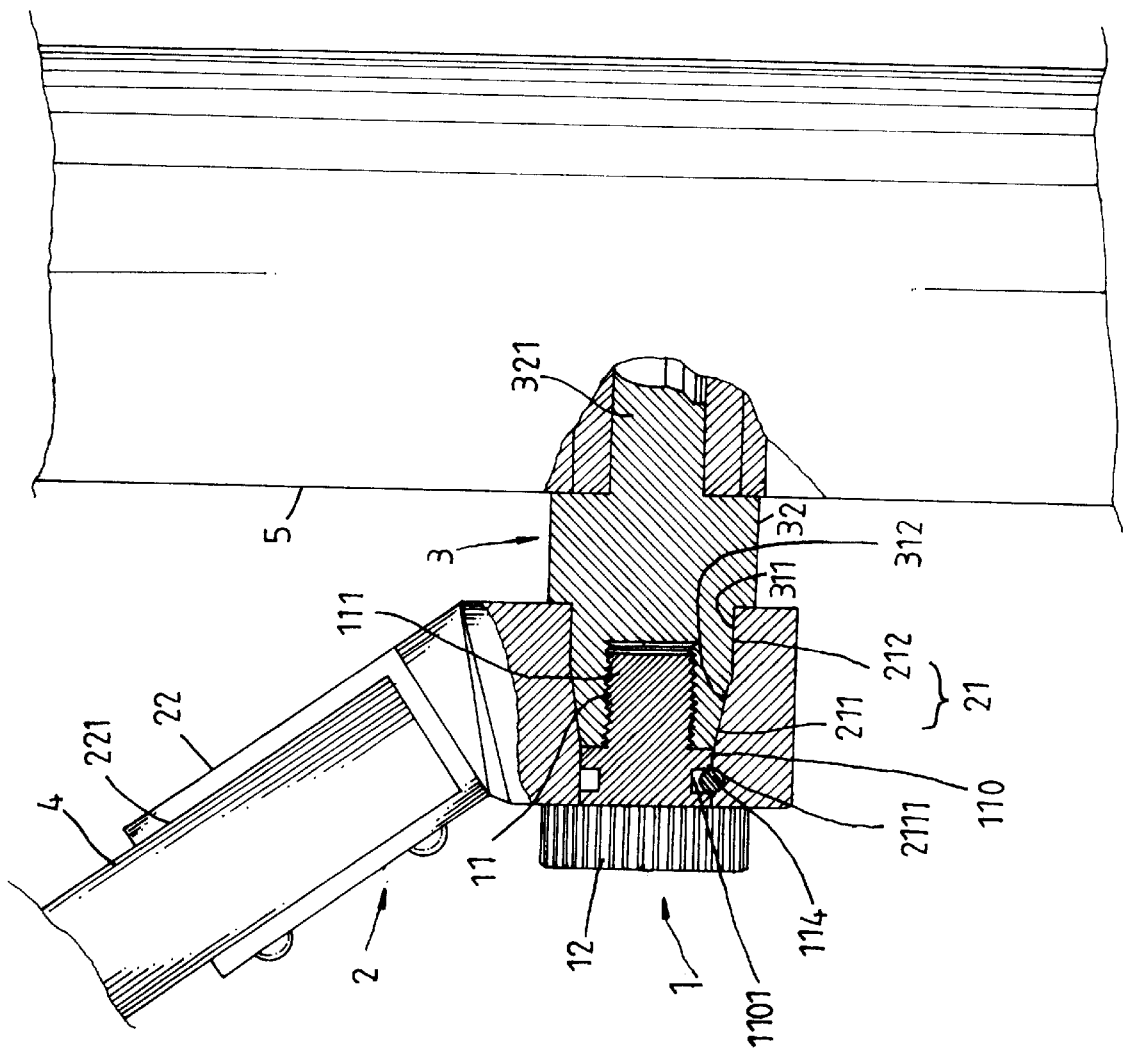
FIG. 2 is a sectional assembly view of the present invention.

Referring to FIGS. 1 and 2, a wheel holder assembly for a golf cart in accordance with the present invention is generally comprised of a holder plate 2, a wheel axle 3, and a lock screw 1, wherein the holder plate 2 is fastened in the frame of a golf cart at a suitable location for fastening the wheel axle 3 by the lock screw 1.

As illustrated, the holder plate 2 comprises a beveled sleeve 22 at the top which defines therein a hole 221 in longitudinal direction for inserting a connecting rod 4 from the frame of a golf cart, a through hole 21 pierced therethrough in transverse direction at a lower location which is formed into a tapered hole 211 and a rectangular hole 212 disposed in line, a slot 2111 on the inner wall surface of the tapered hole 211 at a lower side, and a rivet hole 213 pierced therethrough in transverse direction and extended through the slot 2111. The wheel axle 3 comprises an elongated rod 321 for mounting a wheel 5, a collar 32 for supporting the wheel 5 in place, and a connecting rod 31 opposite to the elongated rod 321 for connecting to the holder plate 2. The connecting rod 31 comprises an unitary rectangular block 312 adjacent to the collar 32, and a hollow tapered rod 311 extending from the rectangular block 312 and in line with the elongated rod 321, wherein the hollow tapered rod 311 has an inner thread 3111 for fastening the lock screw 1. The lock screw 1 comprises a hollow screw rod 11 extending from a toothed head 12, and a shoulder 110 raised around one end of the screw rod 11 and axially extended from an inner side of the toothed head 12. On the shoulder 110, there is made an annular groove 1101 around the periphery. By means of the toothed head 12, the lock screw 1 can be easily rotated with fingers. The hollow screw rod 11 has an outer thread 111 over the outer surface thereof.

The assembly process of the present invention is outlined hereinafter. Insert the connecting rod 31 of wheel axle 3 into the through hole 21 on the holder plate 2 with the tapered rod 311 and the rectangular block 312 respectively engaged into the tapered hole 211 and the rectangular hole 212. Then, insert the hollow screw rod 11 of the lock screw 1 through the tapered hole 211 into the tapered rod 311 with the outer thread 111 screwed into the inner thread 3111. And then, fasten a rivet 114 to the rivet hole 213. When the rivet 114 is inserted into the rivet hole 213, the periphery of the rivet 114 partially upwardly projects through the slot 2111 and engages into the annular groove 1101 of the lock screw 1 to stop the lock screw 1 from an axial movement relative to the wheel axle 3. Therefore, once the holder plate 2 is connected to the frame of a golf cart, the wheel axle 3 becomes firmly secured in place by the lock screw 1.

I claim:

1. A golf cart wheel holder assembly for securing a wheel to a frame of a golf cart, which comprises:

a holder plate secured to the frame of a golf cart, said holder plate having a body portion with a beveled sleeve obliquely extending upward therefrom, said beveled sleeve having a hole therein extending in a longitudinal direction thereof for receiving a connecting rod from the frame of a golf cart; said body portion including a transverse hole passing therethrough in a transverse direction relative thereto and a rivet hole arranged perpendicularity relative to said transverse hole, said transverse hole being a tapered hole at one end and having a rectangular hole at an opposite end, said tapered hole having an inner surface with a lower side and a slot arranged at said lower side of said inner surface, said rivet hole extending through said tapered hole and to an outside of said holder plate;

a wheel axle fastened in said transverse hole for holding a wheel, said wheel axle including an elongated rod for mounting a wheel, a collar for supporting said wheel in place, and a connecting rod opposite to said elongated rod for fastening in said transverse hole, said connecting rod having a unitary rectangular block received in said rectangular hole, and a hollow tapered rod received in said tapered hole, said hollow tapered rod having an inner thread on an inner wall surface thereof;

a rotating lock screw inserted through said transverse hole and securing said wheel axle to said holder plate, said rotating lock screw comprising a toothed head for rotating by fingers, a screw rod having an outer thread screwed into said inner thread on said tapered rod, a shoulder arranged at one end of said screw rod radially extending outward about a periphery of said screw rod and axially extending along a length of said screw rod a distance from one side of said toothed head, said shoulder being inserted into said tapered hole and having an annular groove completely extending around a periphery of said shoulder; and a rivet fastened into said rivet hole; said rivet having a peripheral part projecting out of said slot and engaged into said annular groove of said shoulder of said rotating lock screw to stop said rotating lock screw from an axial movement relative to said transverse hole of said body portion of said holder plate for holding said rotating lock screw on said holder plate when said rotating lock screw is removed from said wheel axle, while permitting rotation of said rotating lock screw for threading said outer thread of said screw rod into said inner thread on said tapered rod for securing and removing said rotating lock screw to and from said said wheel axle.

* * * * *